US007333129B2

(12) United States Patent
Miller et al.

(10) Patent No.: US 7,333,129 B2
(45) Date of Patent: Feb. 19, 2008

(54) FIRE DETECTION SYSTEM

(75) Inventors: Mark S. Miller, Apple Valley, MN (US); Thomas G. Wiegele, Apple Valley, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 640 days.

(21) Appl. No.: 10/186,446

(22) Filed: Jul. 1, 2002

(65) Prior Publication Data

US 2003/0058114 A1 Mar. 27, 2003

Related U.S. Application Data

(60) Provisional application No. 60/323,824, filed on Sep. 21, 2001.

(51) Int. Cl.
*H04N 7/18* (2006.01)

(52) U.S. Cl. ....................... 348/162; 348/143; 348/154

(58) Field of Classification Search ................ 348/162, 348/154, 143; 340/522, 545.3, 506; 169/61
See application file for complete search history.

(56) References Cited

U.S. PATENT DOCUMENTS

| | | | | |
|---|---|---|---|---|
| 4,597,451 | A * | 7/1986 | Moore et al. | 169/61 |
| 5,153,722 | A | 10/1992 | Goedeke et al. | |
| 5,289,275 | A * | 2/1994 | Ishii et al. | 348/154 |
| 5,369,397 | A | 11/1994 | Wong | |
| 5,376,924 | A | 12/1994 | Kubo et al. | |
| 5,486,811 | A * | 1/1996 | Wehrle et al. | 340/522 |

(Continued)

FOREIGN PATENT DOCUMENTS

| | | |
|---|---|---|
| DE | 19546528 | 6/1997 |

(Continued)

OTHER PUBLICATIONS

European Search Report for Application No. EP 04013579, Dec. 8, 2004, Rosemount Aerospace.

(Continued)

*Primary Examiner*—Allen Wong
(74) *Attorney, Agent, or Firm*—Calfee Halter & Griswold LLP

(57) ABSTRACT

A fire detection system for an enclosed area comprises: at least one infrared (IR) imager for generating infrared images of at least a portion of the enclosed area, for determining from the images that a fire is perceived present in the enclosed area, and for generating a first signal indicative of the perceived presence of fire; at least one fire detector for monitoring at least a portion of the enclosed area, the fire detector comprising at least one fire byproduct chemical sensor for generating at least one second signal representative of the presence of at least one fire byproduct chemical in the enclosed area; and a controller governed by the first and second signals to confirm that a fire is present in the enclosed area. In one embodiment, the enclosed area is divided into a plurality of detection zones with at least one fire detector disposed at each detection zone. In this embodiment, the controller includes a first controller governed by the second signals for generating a third signal indicative of the presence of fire in the corresponding detection zone; and a second controller governed by the first and third signals to confirm that a fire is present in at least one detection zone of the enclosed area.

43 Claims, 10 Drawing Sheets

U.S. PATENT DOCUMENTS

| | | | | |
|---|---|---|---|---|
| 5,777,548 | A * | 7/1998 | Murakami et al. | 340/506 |
| 5,861,106 | A | 1/1999 | Olander | |
| 5,865,257 | A | 2/1999 | Kozyrev et al. | |
| 6,019,177 | A | 2/2000 | Olander | |
| 6,184,792 | B1 | 2/2001 | Privalov et al. | |
| 6,653,939 | B2 * | 11/2003 | Galloway | 340/545.3 |
| 2003/0037590 | A1 | 2/2003 | Stark | |
| 2003/0058114 | A1 | 3/2003 | Miller et al. | |

FOREIGN PATENT DOCUMENTS

| | | | |
|---|---|---|---|
| DE | 196 53 781 | A1 | 6/1998 |
| DE | 198 50 564 | A | 5/2000 |
| EP | 0 711 579 | A | 5/1996 |
| EP | 1 103 937 | | 5/2001 |
| FR | 2 723 235 | A | 2/1996 |
| JP | 5281104 | | 10/1993 |
| WO | WO 99/01180 | A | 1/1999 |
| WO | WO 02/069297 | A | 9/2002 |

OTHER PUBLICATIONS

Figaro "Signal Processing and Calibration Techniques for CO Detectors Using TGS2442" Brochure. Apr. 2001 pp. 1-10.

EU Search Report EP05014617, Sep. 29, 2005, The Hague.

Communication from corresponding EP application No. 02775923.2, mailed Apr. 10, 2006.

Communication from corresponding EP application No. 02766324.4-1248, mailed May 23, 2006.

* cited by examiner

FIRE DETECTION SYSTEM

This application claims the benefit of the provisional patent application No. 60/323,824 filed Sep. 21, 2001.

BACKGROUND OF THE INVENTION

The present invention is directed to fire detection systems, in general, and more specifically to a system capable of detecting a fire in a storage area accurately and reliably, with a controller which is governed by at least one IR imager and at least one fire detector disposed at the storage area to confirm the presence of a fire in the storage area.

It is of paramount importance to detect a fire in an unattended, storage area or enclosed storage compartment at an early stage of progression so that it may be suppressed before spreading to other compartments or areas adjacent or in close proximity to the affected storage area or compartment. This detection and suppression of fires becomes even more critical when the storage compartment is located in a vehicle that is operated in an environment isolated from conventional fire fighting personnel and equipment, like a cargo hold of an aircraft, for example. Current aircraft fire suppressant systems include a gaseous material, like Halon® 1301, for example, that is compressed in one or more containers at central locations on the aircraft and distributed through piping to the various cargo holds in the aircraft. When a fire is detected in a cargo hold, an appropriate valve or valves in the piping system is or are activated to release the Halon fire suppressant material into the cargo hold in which fire was detected. The released Halon material is intended to blanket or flood the cargo hold and put out the fire. Heretofore, this has been considered an adequate system.

However, the Halon material of the current systems contains an ozone depleting material which may leak from the storage compartment and into the environment upon being activated to suppress a fire. Most nations of the world prefer banning this material to avoid its harmful effects on the environment. Also, Halon produces toxic products when activated by flame. Accordingly, there is a strong desire to find an alternate material to Halon and a suitable fire suppressant system for dispensing it as needed.

In addition, any time the fire suppressant material is dispensed to flood and blanket a storage area as a result of a fire indication from a fire detection system, it leaves a residue which covers the storage area or compartment and all of its contents. As a result of this situation, a very costly and time consuming clean-up is promptly performed with each dispensing of suppressant material. For cargo holds of aircraft, a fire in the hold indication requires not only a dispensing of the fire suppressant material, but also a prompt landing of the aircraft at the nearest airport. The aircraft will then remain out of service until clean up is completed and the aircraft is certified to fly again. This unscheduled servicing of the aircraft is very costly to the airlines and inconveniences the passengers thereof. The problem is that some activations of the fire suppressant system result from false alarms of the fire detection system, i.e. caused by a perceived fire condition that is something other than an actual fire. Thus, the costs and inconveniences incurred as a result of the dispensing of the fire suppressant material under false alarm conditions could have been avoided with a more accurate and reliable fire detection system.

The present invention intends to overcome the drawbacks of the current fire detection and suppressant systems and to offer a system which detects a fire accurately and reliably, generates a fire indication and provides for a quick dispensing of a fire suppressant, which does not include substantially an ozone depleting material, focused within the storage compartment in which the fire is detected.

SUMMARY OF THE INVENTION

In accordance with one aspect of the present invention, a fire detection system for an enclosed area comprises: at least one infrared (IR) imager for generating infrared images of at least a portion of the enclosed area, for determining from the images that a fire is perceived present in the enclosed area, and for generating a first signal indicative of the perceived presence of fire; at least one fire detector for monitoring at least a portion of the enclosed area, the fire detector comprising at least one fire byproduct chemical sensor for generating at least one second signal representative of the presence of at least one fire byproduct chemical in the enclosed area; and a controller governed by the first and second signals to confirm that a fire is present in the enclosed area.

In accordance with another aspect of the present invention, a fire detection system for an enclosed area having a plurality of detection zones comprises: a plurality of infrared (IR) imagers, each IR imager for generating infrared images of a corresponding portion of the enclosed area, for determining from the images that a fire is perceived present in the corresponding portion, and for generating a first signal indicative of the perceived presence of fire; at least one fire detector disposed at each detection zone, each fire detector for monitoring the corresponding detection zone of the enclosed area, each fire detector comprising at least one fire byproduct chemical sensor for generating at least one second signal representative of the presence of at least one fire byproduct chemical in the corresponding detection zone, and a first controller governed by the second signals for generating a third signal indicative of the presence of fire in the corresponding detection zone; and a second controller governed by the first and third signals to confirm that a fire is present in at least one detection zone of the enclosed area.

DETAILED DESCRIPTION OF THE INVENTION

Figure 1:
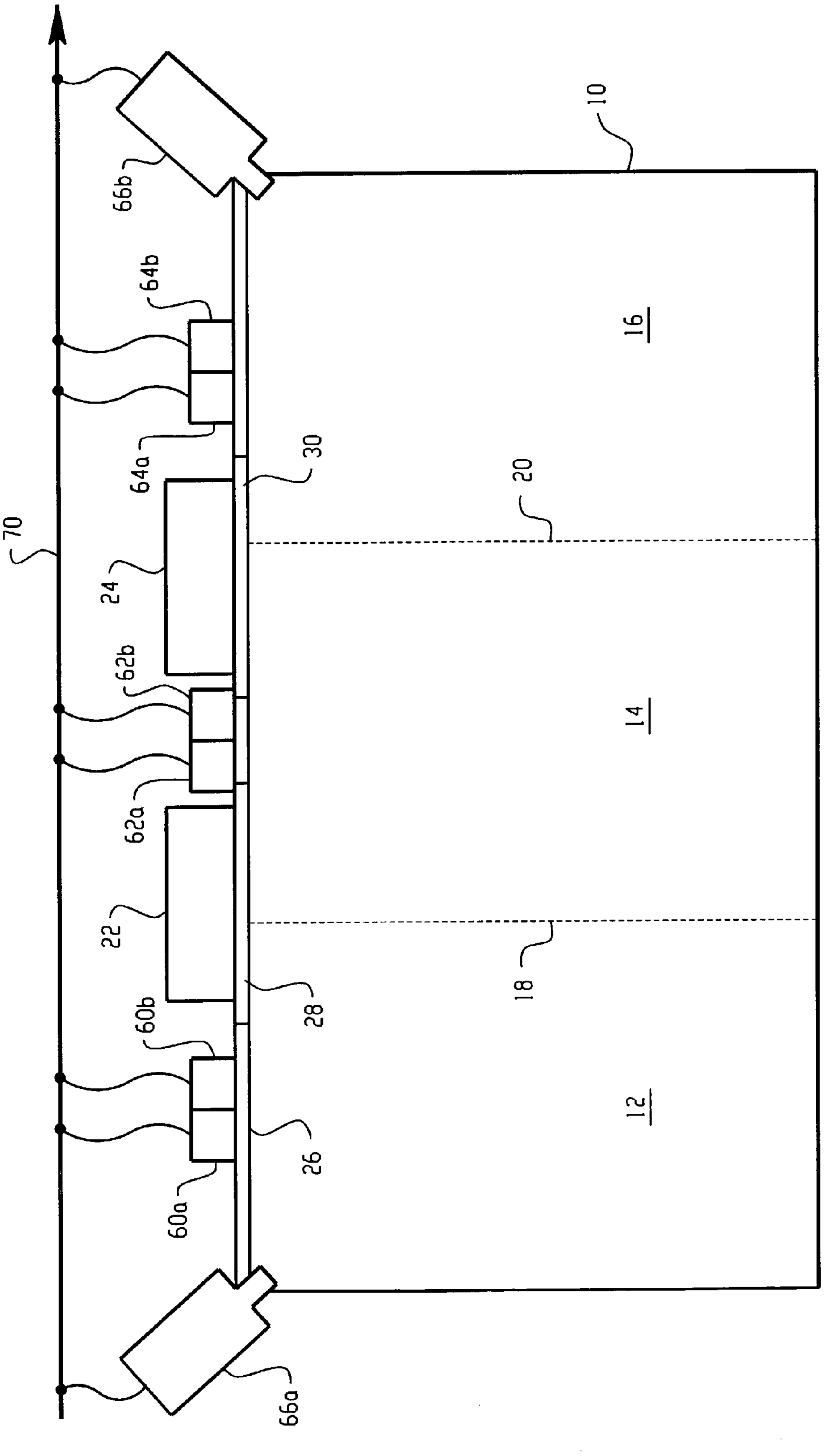
FIG. 1 is a sketch of a fire detection and suppression system for use in a storage compartment suitable for embodying the principles of the present invention.

A sketch of a fire detection and suppression system for use at a storage area or compartment suitable for embodying the principles of the present invention is shown in cross-sectional view in FIG. 1. Referring to FIG. 1, a storage compartment 10 which may be a cargo hold, bay or compartment of an aircraft, for example, is divided into a plurality of detection zones or cavities 12, 14 and 16 as delineated by dashed lines 18 and 20. It is understood that an aircraft may have more than one cargo compartment and the embodiment depicted in FIG. 1 is merely exemplary of each such compartment. It is intended that each of the cargo compartments 10 include one or more gas generators for generating a fire suppressant material. In the present embodiment, a plurality of hermetically sealed, gas generators depicted by blocks 22 and 24, which may be solid propellant in ultra-low pressure gas generators, for example, are disposed at a ceiling portion 26 of the cargo compartment 10 above vented openings 28 and 30 as will be described in greater detail herein below.

In the present embodiment, the propellant of the plurality of gas generators 22 and 24 produces upon ignition an aerosol that is principally potassium bromide. The gaseous products are principally water, carbon dioxide and nitrogen. For aircraft applications, the gas generators 22 and 24 have large multiple orifices instead of the conventional sonic nozzles. As a result, the internal pressure during the discharge period is approximately 10 psig. During storage and normal flight the pressure inside the generator is the normal change in pressure that occurs in any hermetically sealed container that is subjected to changes in ambient conditions.

Test results of gas generators of the solid propellant type are shown in Table 1 below. The concept that is used for ETOPS operations up to 240 minutes is to expend three gas generators of 3½ lbs each for each 2000 cubic feet. This would create the functional equivalent of an 8% Halon 1301 system. At 30 minutes, the concentration would be reduced to the functional equivalent of 4½% Halon 1301. At that point, another gas generator may be expended every 30 minutes. Different quantities of gas generators may be used based upon the size of the cargo bay. It is understood that the size and number of the generators for a cargo compartment may be modified based on the size of the compartment and the specific application

TABLE 1

Requirements Of Present Embodiment vs. Halon in 2000 Cubic Feet

| | Suppression Threshold | Design Minimum | 30 Minute initial Release |
|---|---|---|---|
| Fuel Fire | 3.5 pounds | 4.6 pounds | 9.2 pounds |
| Bulk Load Test | <2.5 pounds | <2.5 pounds | <2.5 pounds |
| Container Test | 3.5 pounds | 4.6 pounds | 9.2 pounds |
| Aerosol Can Test | | 4.6 pounds | |
| Halon requirement | 25 pounds = 3% of Halon | 33 pounds = 4% of Halon | 66 pounds = 8% of Halon |

Figure 10:
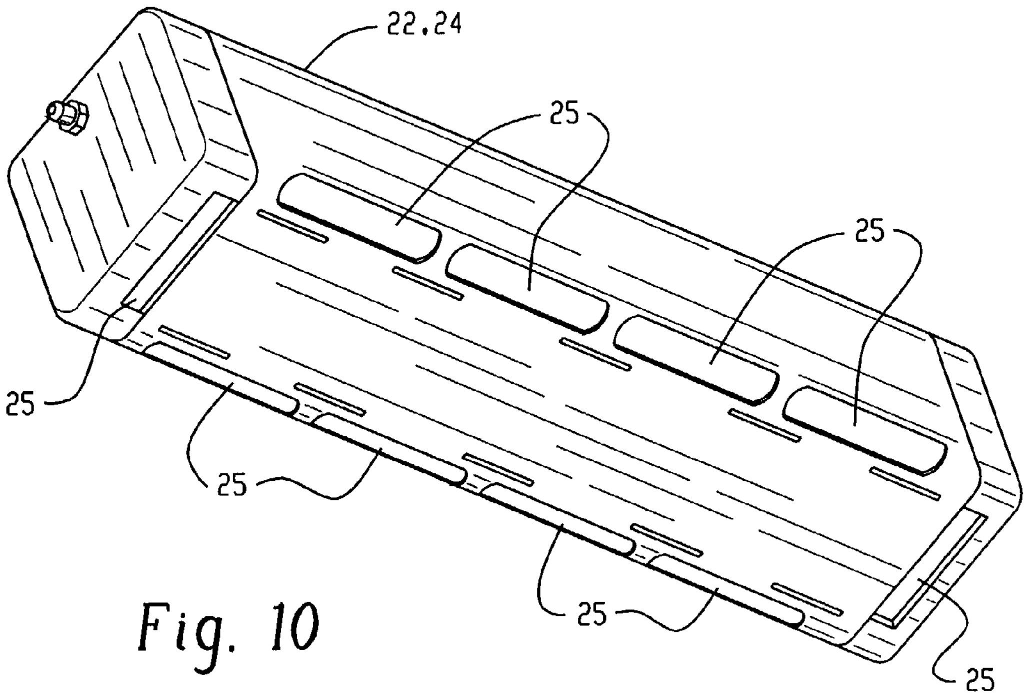
FIG. 10 is an isometric view of an exemplary gas generator illustrating exhaust ports thereof suitable for use in the embodiment of FIG. 1.

An exemplary hermetically sealed, gas generator 22,24 with multiple outlets 25 for use in the present embodiment is shown in the isometric sketch of FIG. 10. The gas generator 22,24 may employ the same or similar initiator that has been used in the U.S. Air Force's ejection seats for many years which has a history of both reliability and safety. Its ignition element consists of two independent 1-watt/1-ohm bridge wires or squibs, for example. The gas generator 22, 24 for use in the present embodiment will be described in greater detail herein below in connection with the break away assembly illustration of FIG. 11.

Figure 2:
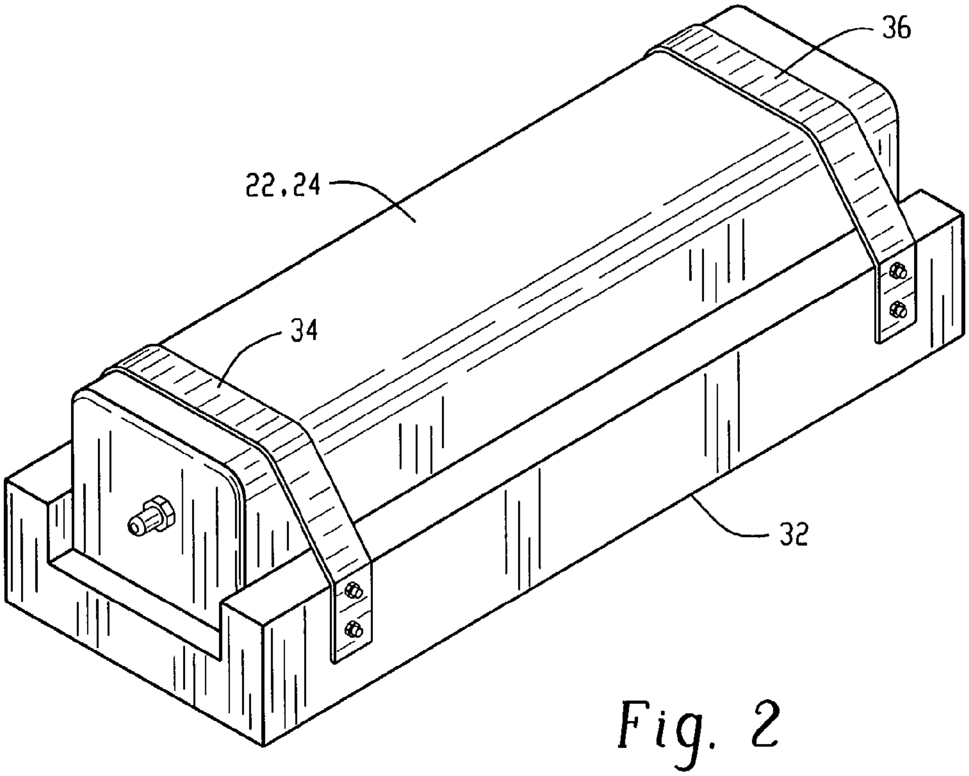
FIGS. 2 and 3 are top and bottom isometric views of an exemplary gas generator assembly suitable for use in the embodiment of FIG. 1.
Figure 3:
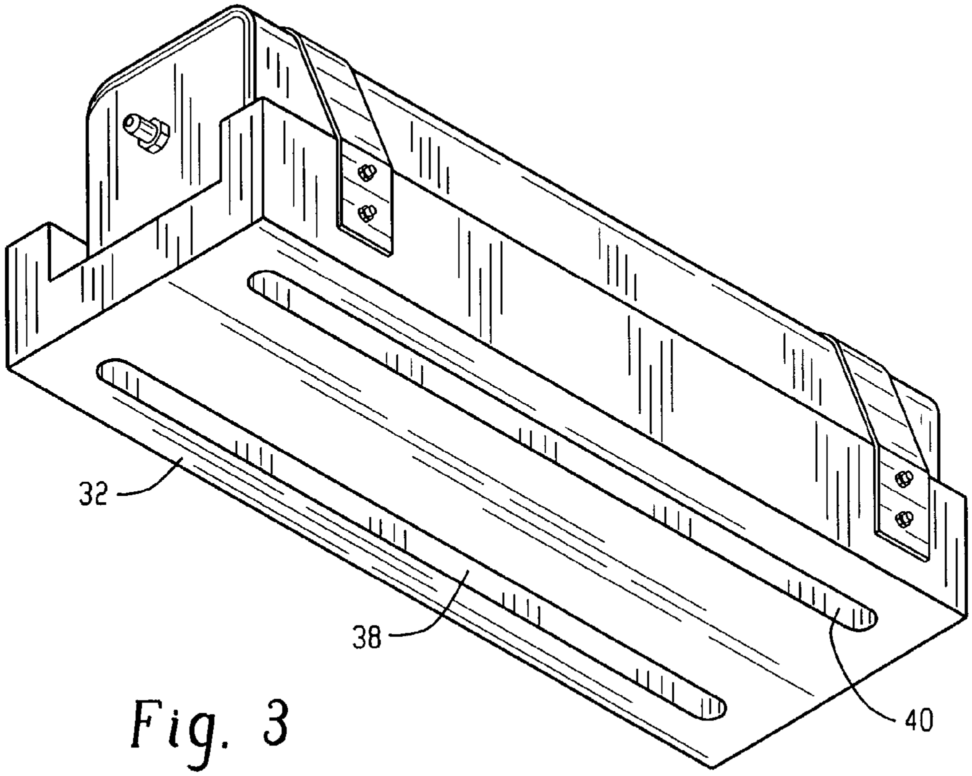

In the top view of FIG. 2 and bottom view of FIG. 3, the sealed container 22,24 is shown mounted to a base 32 by supporting straps 34 and 36, for example. The bottom of the base 32 which has a plurality of openings 38 and 40 may be mounted to the ceiling 26 over vented portions 28 and 30 thereof to permit passage of the aerosol and gaseous fire suppressant products released or exhausted from the gas generator via outlets 25 out through the vents 28 and 30 and into the compartment 10.

Figure 4:
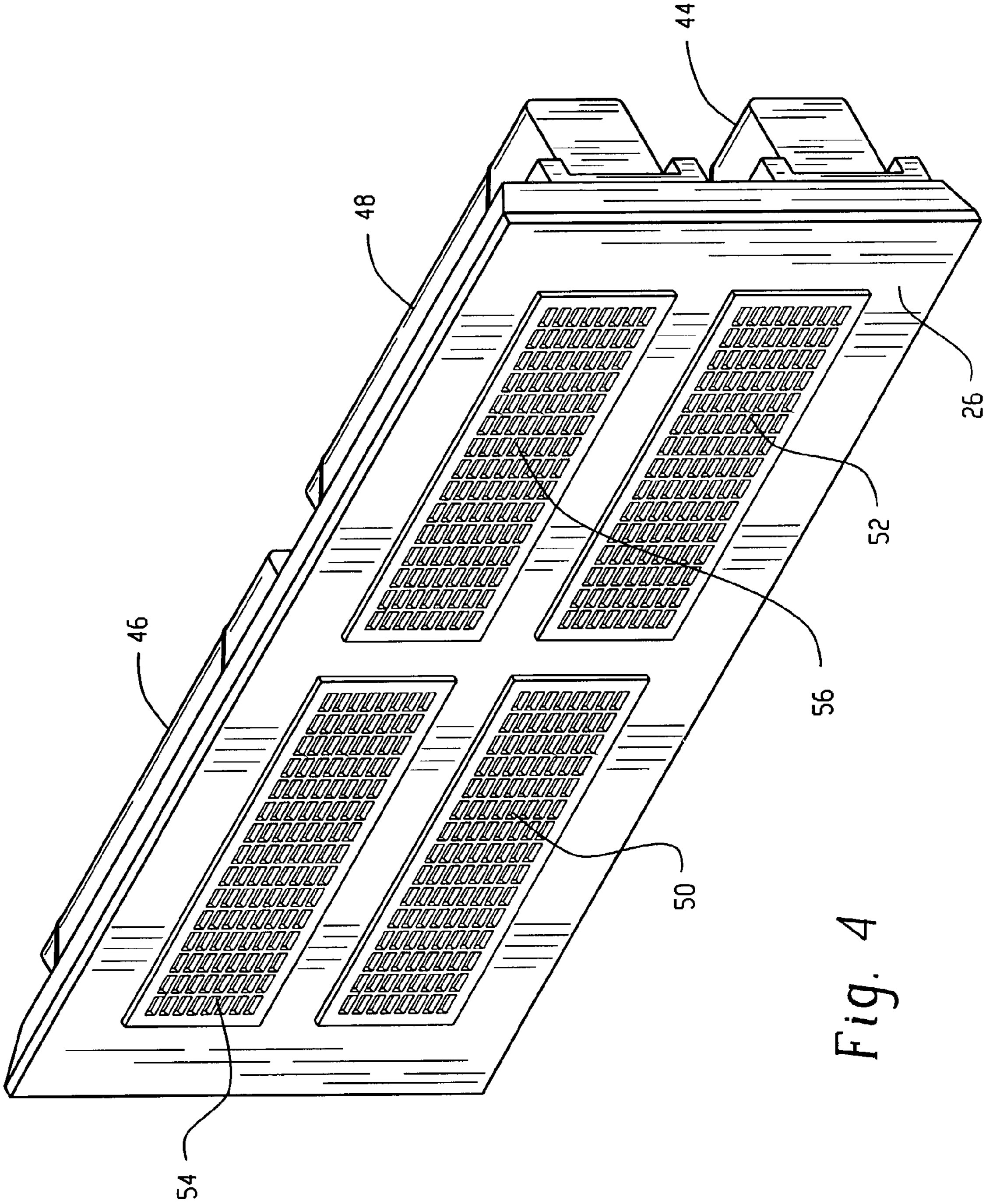
FIGS. 4 and 5 are bottom and top isometric views of an exemplary gas generator assembly compartment mounting suitable for use in the embodiment of FIG. 1.
Figure 5:
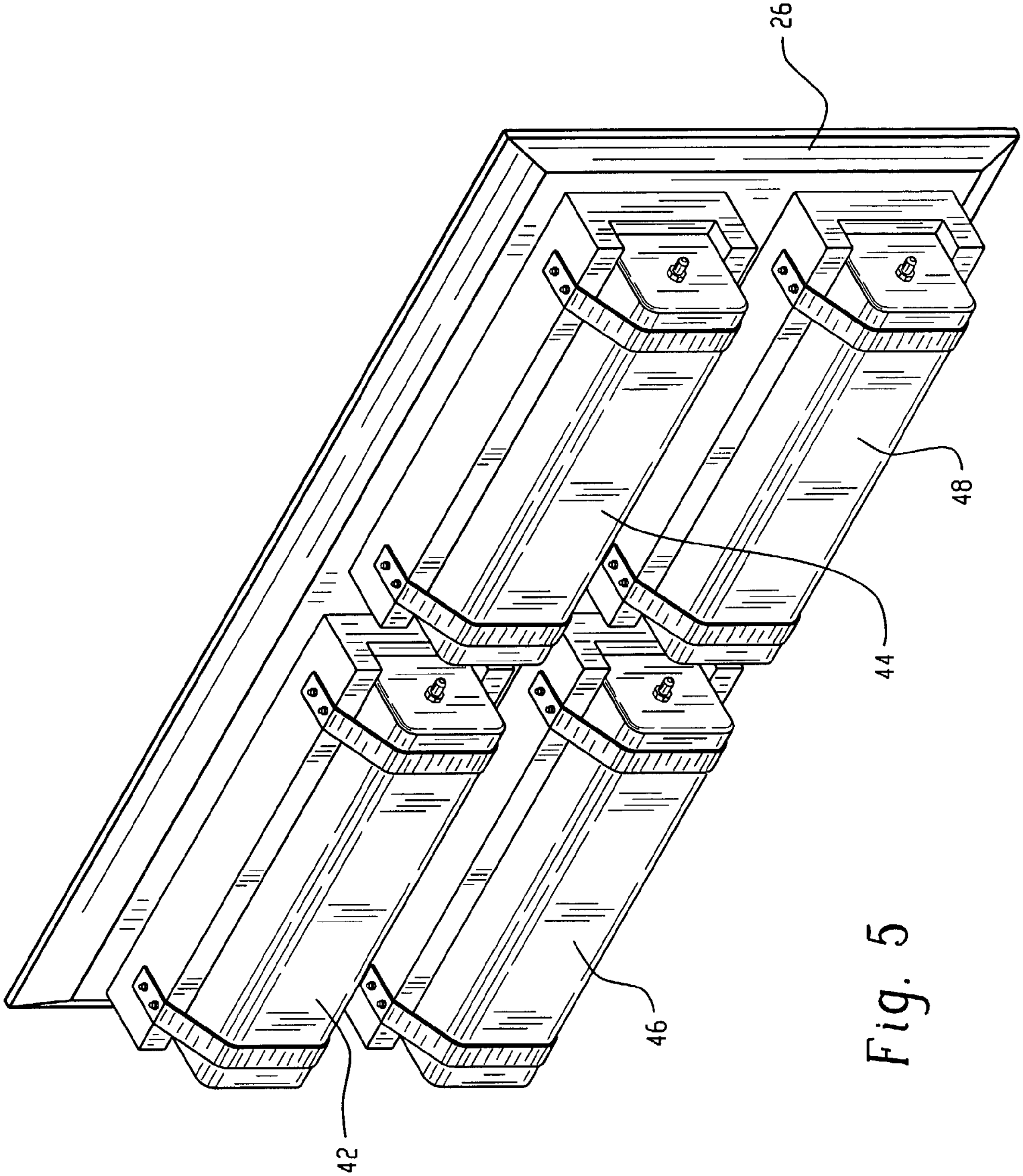

The present example employs four gas generators for compartment 10 which are shown in bottom view in FIG. 4 and top view in FIG. 5. As shown in FIGS. 4 and 5, in the present embodiment, each of the four gas generators 42, 44, 46 and 48 is installed with its base over a respectively corresponding vented portion 50, 52, 54, 56 of the ceiling 26. Accordingly, when initiated, each of the gas generators will generate and release its aerosol and gaseous fire suppressant products through the openings in its respective base and vented portion of the ceiling into the compartment 10.

With the present embodiment, the attainment of 240 or 540 minutes or longer of fire suppressant discharge is a function of how many gas generators are used for a compartment. It is expected that the suppression level will be reached in an empty compartment in less than 10 seconds, for example. This time may be reduced in a filled compartment. Aerosol tests demonstrated that the fire suppressant generated by the gas generators is effective for fuel/air explosives also. In addition, the use of independent gas generator systems for each cargo compartment further improved the system's effectiveness. For a more detailed description of solid propellant gas generators of the type contemplated for the present embodiment, reference is made to the U.S. Pat. No. 5,861,106, issued Jan. 19, 1999, and entitled "Compositions and Methods For Suppressing Flame" which is incorporated by reference herein. This patent is assigned to Universal Propulsion Company, Inc. which is the same assignee and/or a wholly-owned subsidiary of the parent company of the assignee of the instant application. A divisional application of the referenced '106 patent was later issued as U.S. Pat. No. 6,019,177 on Feb. 1, 2000 having the same ownership as its parent '106 patent.

Referring back to FIG. 1, as explained above, each cargo compartment 10 may be broken into a plurality of detection zones 12, 14 and 16. The number of zones in each cargo compartment will be determined after sufficient testing and analysis in order to comply with the application requirements, like a one minute response time, for example. The present embodiment includes multiple fire detectors distributed throughout each cargo compartment 10 with each fire detector including a variety of fire detection sensors. For example, there may be two fire detectors installed in each zone 12, 14 and 16 in a dual-loop system. The two fire detectors in each zone may be mounted next to each other, inside pans located above the cargo compartment ceiling 26, like fire detectors 60*a* and 60*b* for zone 12, fire detectors 62*a* and 62*b* for zone 14 and 64*a* and 64*b* for zone 16, for example. In the present embodiment, each of the fire detectors 60*a*, 60*b*, 62*a*, 62*b*, 64*a* and 64*b* may contain monoxide (CO) gas detector, and hydrogen ($H_2$) gas detector as will be described in greater detail herein below. While in the present application a specific combination of fire detection sensors is being used in a fire detector, it is understood that in other applications or storage areas, different combinations of sensors may be used just as well.

In addition, at least one IR imager may be disposed at each cargo compartment 10 for fire detection confirmation, but it is understood that in some applications imagers may not be needed. In the present embodiment, two IR imagers 66_a_ and 66_b_ may be mounted in opposite top corners of the compartment 10, preferably behind a protective shield, in the dual-loop system. This mounting location will keep each imager out of the actual compartment and free from damage. Each imager 66_a_ and 66_b_ may include a wide-angle lens so that when aimed towards the center or bottom center of the compartment 10, for example, the angle of acceptance of the combination of two imagers will permit a clear view of the entire cargo compartment including across the ceiling and down the side walls adjacent the imager mounting. It is intended for the combination of imagers to detect any hot cargo along the top of the compartment, heat rise from cargo located below the top, and heat reflections from the compartment walls. Each fire detector 60_a_, 60_b_, 62_a_, 62_b_, 64_a_ and 64_b_ and IR imagers 66_a_ and 66_b_ will include self-contained electronics for determining independently whether or signal indicative thereof as will be described in greater detail herein below.

All fire detectors and IR imagers of each cargo compartment 10 may be connected in a dual-loop system via a controller area network (CAN) bus 70 to cargo fire detection control unit (CFDCU) as will be described in more detail in connection with the block diagram schematic of FIG. 8. The location of the CFDCU may be based on the particular application or aircraft, for example. A suitable location for mounting the CFDCU in an aircraft is at the main avionics bay equipment rack.

Figure 6:
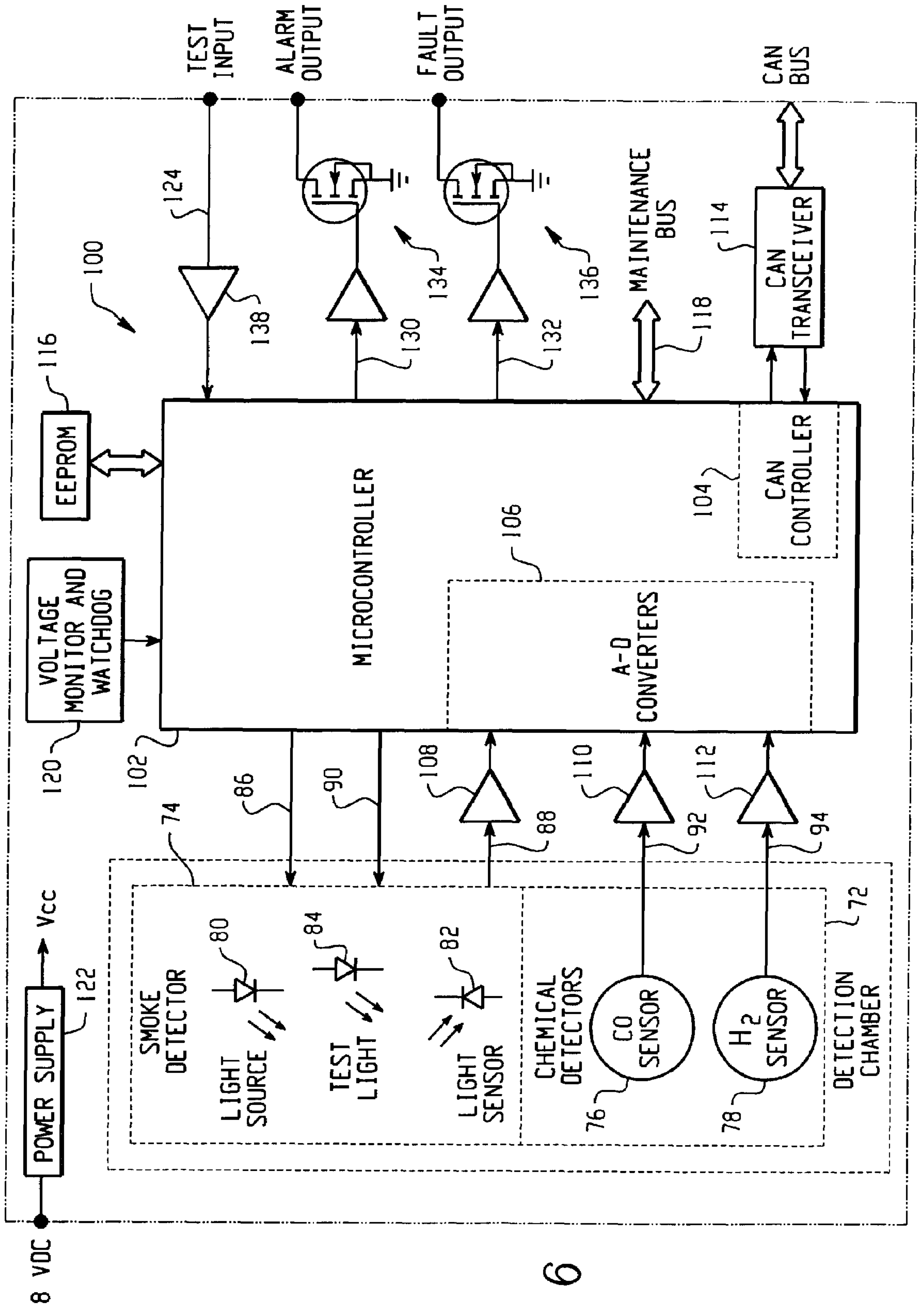
FIG. 6 is a block diagram schematic of an exemplary fire detector unit suitable for use in the embodiment of FIG. 1.

A block diagram schematic of an exemplary fire detector unit suitable for use in the present embodiment is shown in FIG. 6. Referring to FIG. 6, all of the sensors used for fire detection are disposed in a detection chamber 72 which includes a smoke detector 74, a carbon monoxide (CO) sensor 76, and a hydrogen ($H_2$) sensor 78, for example. The smoke detector 74 may be a photoelectric device that has been and is currently being used extensively in such applications as aircraft cargo bays, and lavatory, cabin, and electronic bays, for example. The smoke detector 74 incorporates several design features which greatly improves system operational reliability and performance, like free convection design which maximizes natural flow of the smoke through the detection chamber, computer designed detector labyrinth which minimizes effects of external and reflected light, chamber screen which prevents large particles from entering the detector labyrinth, use of solid state optical components which minimizes size, weight, and power consumption while increasing reliability and operational life, provides accurate and stable performance over years of operation, and offers an immunity to shock and vibration, and isolated electronics which completes environmental isolation of the detection electronics from the contaminated smoke detection chamber.

More specifically, in the smoke detector, a light emitting diode (LED) 80 and photoelectric sensor (photo diode) 82 are mounted in an optical block within the labyrinth such that the sensor 82 receives very little light normally. The labyrinth surfaces may be computer designed such that very little light from the LED 80 is reflected onto the sensor, even when the surfaces are coated with particles and contamination build-up. The LED 80 may be driven by an oscillating signal 86 that is synchronized with a photodiode detection signal 88 generated by the photodiode 82 in order to maximize both LED emission levels and detection and/or noise rejection. The smoke detector 74 may also include built-in test electronics (BITE), like another LED 84 which is used as a test light source. The test LED 84 may be driven by a test signal 90 that may be also synchronized with the photodiode detection signal 88 generated by the photodiode 82 in order to better effect a test of the proper operation of the smoke detector 74.

Chemical sensors 76 and 78 may be each integrated on and/or in a respective semiconductor chip of the micro-electromechanical system (MEMS)—based variety for monitoring and detecting gases which are the by-products of combustion, like CO and $H_2$, for example. The semiconductor chips of the chemical sensors 76 and 78 may be each mounted in a respective container, like a TO-8 can, for example, which are disposed within the smoke detection chamber 72. The TO-8 cans include a screened top surface to allow gases in the environment to enter the can and come in contact with the semiconductor chip which measures the CO or $H_2$ content in the environment.

More specifically, in the present embodiment, the semiconductor chip of the CO sensor 76 uses a multilayer MEMS structure. A glass layer for thermal isolation is printed between a ruthenium oxide ($RuO_2$) heater and an alumina substrate. A pair of gold electrodes for the heater is formed on a thermal insulator. A tin oxide ($SnO_2$) gas sensing layer is printed on an electrical insulation layer which covers the heater. A pair of gold electrodes for measuring sensor resistance or conductivity is formed on the electrical insulator for connecting to the leads of the TO-8 can. Activated charcoal is included in the area between the internal and external covers of the TO-8 can to reduce the effect of noise gases. In the presence of CO, the conductivity of sensor 76 increases depending on the gas concentration in the environment. The CO sensor 76 generates a signal 92 which is representative of the CO content in the environment detected thereby. It may also include BITE for the testing of proper operation thereof. This type of CO sensor displayed good selectivity to carbon monoxide.

In addition, the semiconductor chip of the $H_2$ sensor 78 in the present embodiment comprises a tin dioxide ($SnO_2$) semiconductor that has low conductivity in clean air. In the presence of $H_2$, the sensor's conductivity increases depending on the gas concentration in the air. The $H_2$ sensor 78 generates a signal 94 which is representative of the $H_2$ content in the environment detected thereby. It may also include BITE for the testing of proper operation thereof. Integral heaters and temperature sensors within both the CO and $H_2$ sensors, 76 and 78, respectively, stabilize their performance over the operating temperature and humidity ranges and permit self-testing thereof. For a more detailed description of such MEMS-based chemical sensors reference is made to the co-pending patent application Ser. No. 09/940,408, filed on Aug. 27, 2001 and entitled "A Method of Self-Testing A Semiconductor Chemical Gas Sensor Including An Embedded Temperature Sensor" which is incorporated by reference herein. This application is assigned to Rosemount Aerospace Inc. which is the same assignee and/or a wholly-owned subsidiary of the parent company of the assignee of the instant application.

Each fire detector also includes fire detector electronics 100 which may comprise solid-state components to increase reliability, and reduce power consumption, size and weight. The heart of the electronics section 100 for the present embodiment is a single-chip, highly-integrated conventional 8-bit microcontroller 102, for example, and includes a CAN bus controller 104, a programmable read only memory (ROM), a random access memory (RAM), multiple timers (all not shown), multi-channel analog-to-digital converter (ADC) 106, and serial and parallel I/O ports (also not shown). The three sensor signals (smoke 88, CO 92, and $H_2$ 94) may be amplified by amplifiers 108, 110 and 112, respectively, and fed into inputs of the microcontroller's ADC 106. Programmed software routines of the microcontroller 102 will control the selection/sampling, digitization and storage of the amplified signals 88, 92 and 94 and may compensate each signal for temperature effects and compare each signal to a predetermined alarm detection threshold. In the present embodiment, an alarm condition is determined to be present by the programmed software routine if all three sensor signals are above their respective detection threshold. A signal representative of this alarm condition is transmitted along with a digitally coded fire detection source identification tag to the CFDCU over the CAN bus 70 using the CAN controller 104 and a CAN transceiver 114.

Using preprogrammed software routines, the microcontroller 102 may perform the following primary control functions for the fire detector: monitoring the smoke detector photo diode signal 88, which varies with smoke concentration; monitoring the CO and $H_2$ sensor conductivity signals 92 and 94, which varies with their respective gas concentration; identifying a fire alarm condition, based on the monitored sensor signals; receiving and transmitting signals over the CAN bus 70 via controller 104 and transceiver 114; generating discrete ALARM and FAULT output signals 130 and 132 via gate circuits 134 and 36, respectively; monitoring the discrete TEST input signal 124 via gate 138; performing built-in-test functions as will be described in greater detail herebelow; and generating supply voltages from a VDC power input via power supply circuit 122.

In addition, the microcontroller 102 communicates with a non-volatile memory 116 which may be a serial EEPROM (electrically erasable programmable read only memory), for example, that stores predetermined data like sensor calibration data and maintenance data, and data received from the CAN bus, for example. The microcontroller 102 also may have a serial output data bus 118 that is used for maintenance purposes. This bus 118 is accessible when the detector is under maintenance and is not intended to be used during normal field operation. It may be used to monitor system performance and read detector failure history for troubleshooting purposes, for example. All inputs and outputs to the fire detector are filtered and transient protected to make the detector immune to noise, radio frequency (RF) fields, electrostatic discharge (ESD), power supply transients, and lightning. In addition, the filtering minimizes RF energy emissions.

Each fire detector may have BITE capabilities to improve field maintainability. The built-in-test will perform a complete checkout of the detector operation to insure that it detects failures to a minimum confidence level, like 95%, for example. In the present embodiment, each fire detector may perform three types of BITE: power-up, continuous, and initiated. Power-up BITE will be performed once at power-up and will typically comprise the following tests: memory test, watchdog circuit verification, microcontroller operation test (including analog-to-digital converter operation), LED and photo diode operation of the smoke detector 74, smoke detector threshold verification, proper operation of the chemical sensors 76 and 78, and interface verification of the CAN bus 70. Continuous BITE testing may be performed on a continuous basis and will typically comprise the following tests: LED operation, Watchdog and Power supply (122) voltage monitor using the electronics of block 120, and sensor input range reasonableness. Initiated BITE testing may be initiated and performed when directed by a discrete TEST Detector input signal 124 or by a CAN bus command received by the CAN transceiver 114 and CAN controller 104 and will typically perform the same tests as Power-up BITE.

Figure 7:
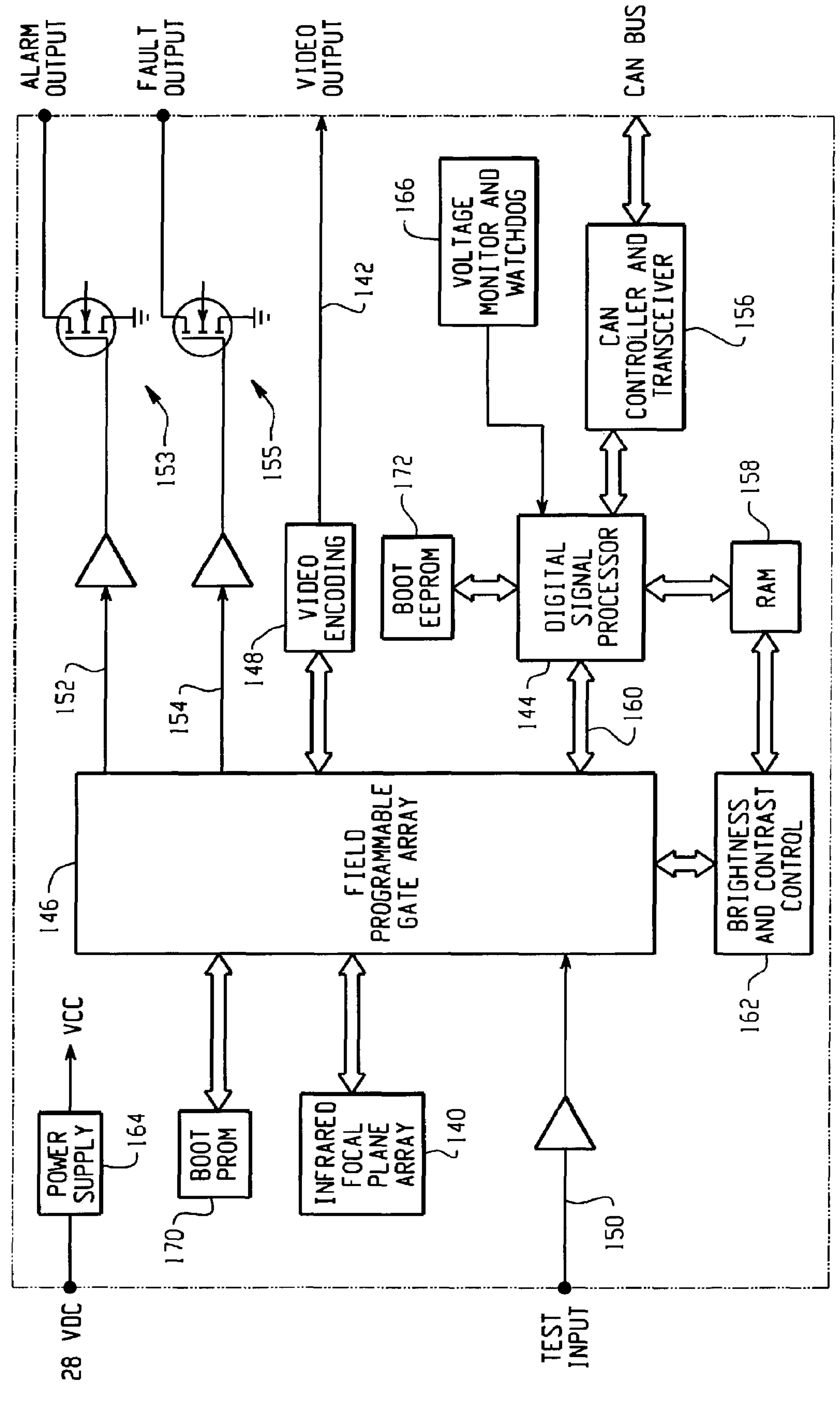
FIG. 7 is a block diagram schematic of an exemplary imager unit suitable for use in the embodiment of FIG. 1.

A block diagram schematic of an exemplary IR imager suitable for use in the fire detection system of the present embodiment is shown in FIG. 7. Referring to FIG. 7, each imager is based on infrared focal plane array technology. A focal plane infrared imaging array 140 detects optical wavelengths in the far infrared region, like on the order of 8-12 microns, for example. Thermal imaging is done at around 8-12 microns since room temperature objects emit radiation in these wavelengths. The exact field-of-view of a wide-angle, fixed-focus lens of the IR imager will be optimized based on the imager's mounting location as described in connection with the embodiment of FIG. 1. Each imager **66*a* and 66*b* is connected to and controlled by the CAN bus 70. Each imager may output a video signal 142 to the aircraft cockpit in the standard NTSC format. Similar to the fire detectors, the imagers may operate in both "Remote Mode" and "Autonomous Mode", as commanded by the CAN bus 70**.

The imager's infrared focal plane array (FPA) 140 may be an uncooled microbolometer with 320 by 240 pixel resolution, for example, and may have an integral temperature sensor and thermoelectric temperature control. Each imager may include a conventional digital signal processor (DSP) 144 for use in real-time, digital signal image processing. A field programmable gate array (FPGA) 146 may be programmed with logic to control imager components and interfaces to the aircraft, including the FPA 140, a temperature controller, analog-to-digital converters, memory, and video encoder 148. Similar to the fire detectors, the FPGA 146 of the imagers may accept a discrete test input signal 150 and output both an alarm signal 152 and a fault signal 154 via circuits 153 and 155, respectively. The DSP 144 is preprogrammed with software routines and algorithms to perform the video image processing and to interface with the CAN bus via a CAN bus controller and transceiver 156.

The FPGA 146 may be programmed to command the FPA 140 to read an image frame and digitize and store in a RAM 158 the IR information or temperature of each FPA image picture element or pixel. The FPGA 146 may also be programmed to notify the DSP 144 via signal lines 160 when a complete image frame is captured. The DSP 144 is preprogrammed to read the pixel information of each new image frame from the RAM 158. The DSP 144 is also programmed with fire detection algorithms to process the pixel information of each frame to look for indications of flame growth, hotspots, and flicker. These algorithms include predetermined criteria through which to measure such indications over time to detect a fire condition. When a fire condition is detected, the imager will output over the CAN bus an alarm signal along with a digitally coded source tag and the discrete alarm output 152. The algorithms for image signal processing may compensate for environmental concerns such as vibration (camera movement), temperature variation, altitude, and fogging, for example. Also, brightness and contrast of the images generated by the FPA 140 may be controller by a controller 162 prior to the image being stored in the RAM 158.

In addition, the imager may have BITE capabilities similar to the fire detectors to improve field maintainability. The built-in-tests of the imager may perform a complete checkout of its operations to insure that it detects failures to a minimum confidence level, like around 95%, for example. Each imager 66*a* and 66*b* may perform three types of BITE: power-up, continuous, and initiated. Power-up BITE may be performed once at power-up and will typically consist of the following: memory test, watchdog circuit and power supply (164) voltage monitor verification via block 166, DSP operation test, analog-to-digital converter operation test, FPA operation test, and CAN bus interface verification, for example. Continuous BITE may be performed on a continuous basis and will typically consist of the following tests: watchdog, power supply voltage monitor, and input signal range reasonableness. Initiated BITE may be performed when directed by the discrete TEST Detector input signal 150 or by a CAN bus command and will typically perform the same tests as Power-up BITE. Also, upon power up, the FPGA 146 may be programmed from a boot PROM 170 and the DSP may be programmed from a boot EEPROM 172, for example.

Figure 8A:
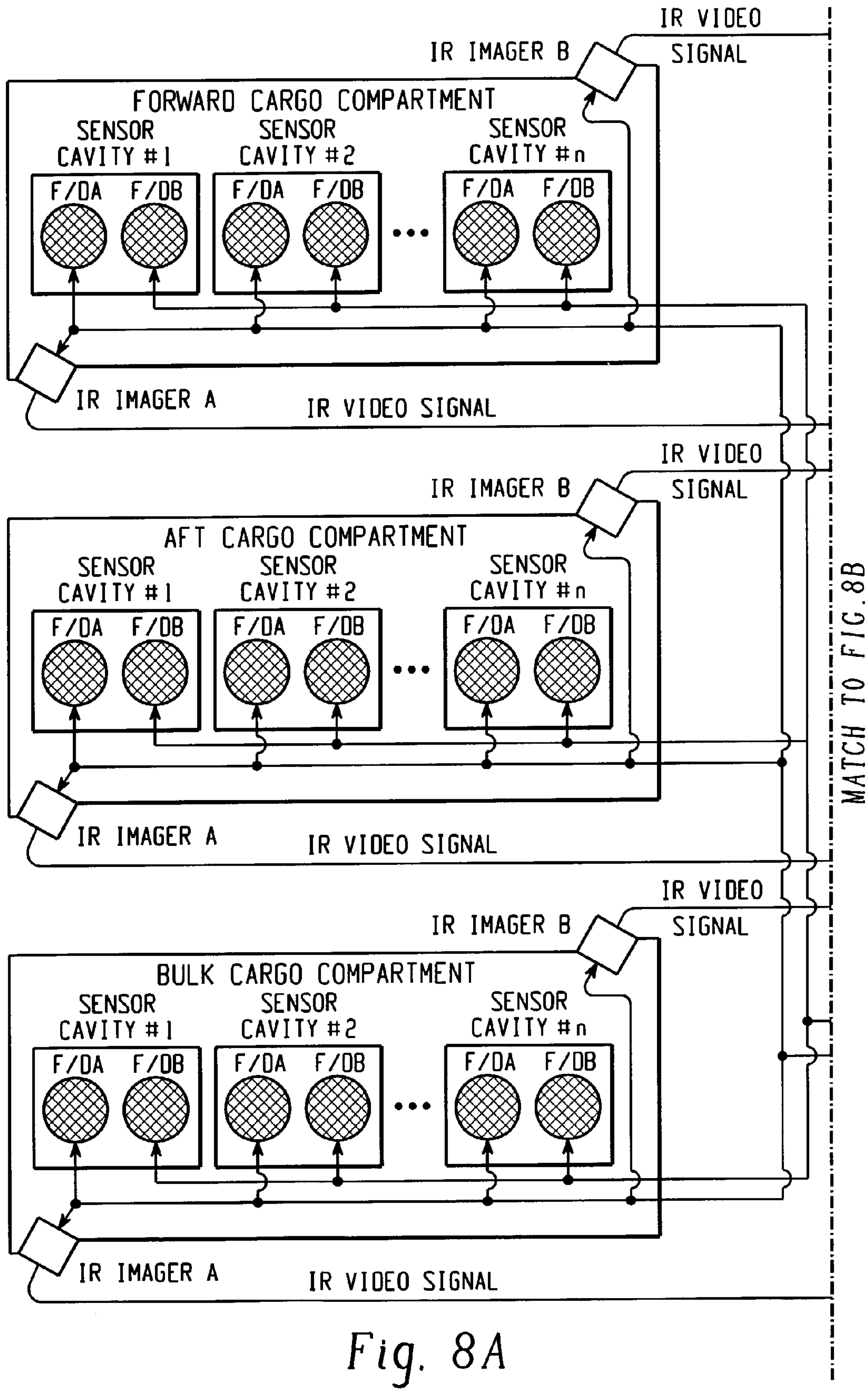
FIG. 8 is a block diagram schematic of an overall fire detection system suitable for use in the application of an aircraft.
Figure 8B:
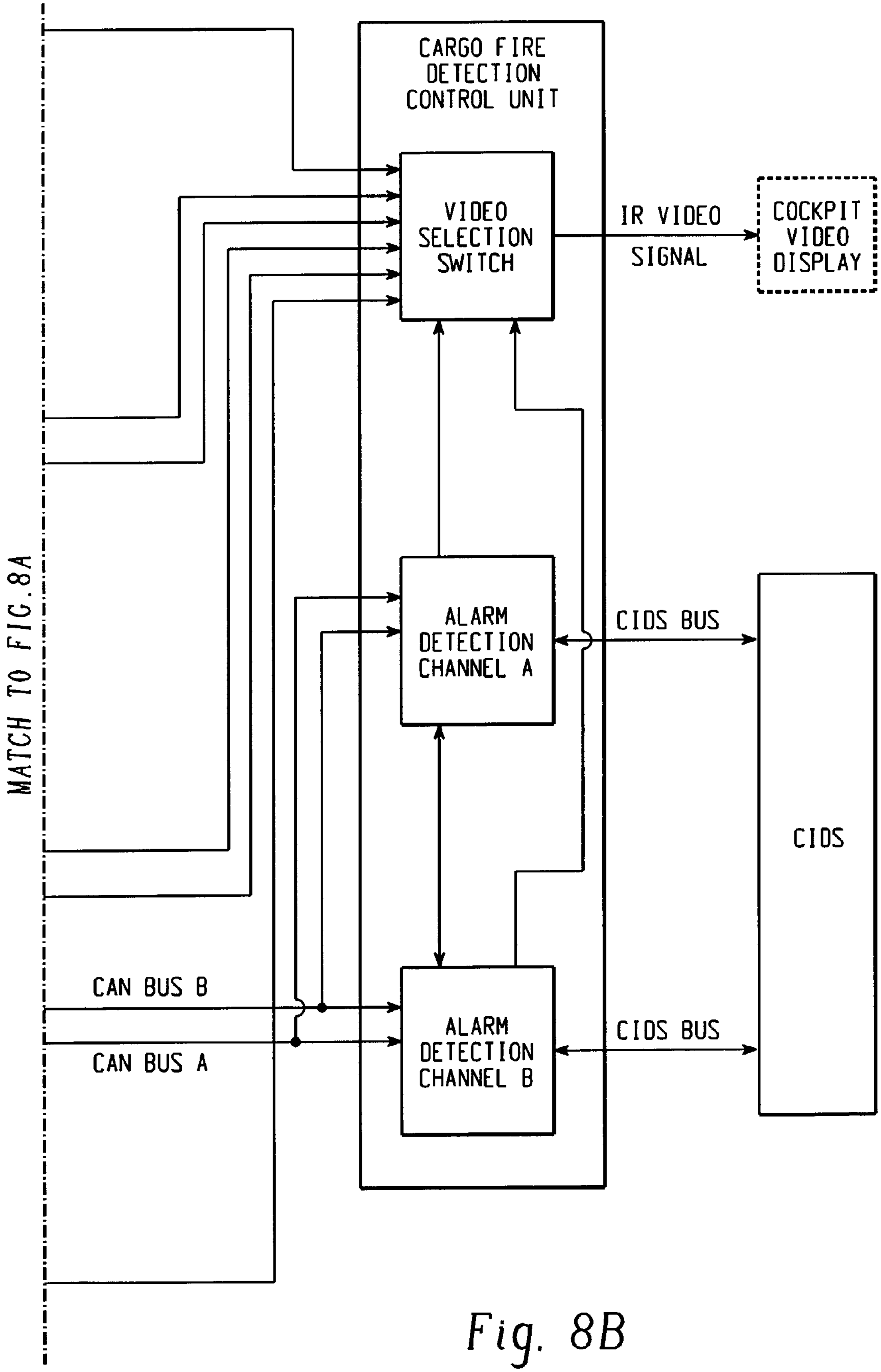

A block diagram schematic of an exemplary overall fire detection system for use in the present embodiment is shown in FIG. 8. In the example of FIG. 8, the application includes three cargo compartments, namely: a forward or FWD cargo compartment, and AFT cargo compartment, and a BULK cargo compartment. As described above, each of these compartments are divided into a plurality of n sensor zones or cavities #1, #2, . . . , #n and in each cavity there are disposed a pair of fire detectors F/D A and F/D B. Each of the compartments also include two IR imagers A and B disposed in opposite corners of the ceilings thereof to view the overall space of the compartment in each case. Alarm condition signals generated by the fire detectors and IR imagers of the various compartments are transmitted to the CFDCU over a dual loop bus, CAN bus A and CAN bus B. In addition, IR video signals from the IR imagers are conducted over individual signal lines to a video selection switch of the CFDCU which selects one of the IR video signals for display on a cockpit video display.

In the present embodiment, the CFDCU may contain two identical, isolated alarm detection channels A and B. Each channel A and B includes software programs to process and independently analyze the inputs from the fire Detectors and IR imagers of each cargo compartment FWD, AFT and BULK received from both buses CAN bus A and CAN bus B and determine a true fire condition/alarm and compartment source location thereof. A "true" fire condition may be detected by all types of detectors of a compartment, therefore, a fire alarm condition will only be generated if both: (1) the smoke and/or chemical sensors detect the presence of a fire, and (2) the IR imager confirms the condition or vice versa. If only one sensor detects fire, the alarm will not be activated. This AND-type logic will minimize false alarms. This alarm condition information may be sent to a cabin intercommunication data system (CIDC) over data buses, CIDS bus A and CIDS bus B and to other locations based on the particular application. Besides the CAN bus interface, each fire detector and IR imager will have discrete Alarm and Fault outputs, and a discrete Test input as described herein above in connection with the embodiments of FIGS. 6 and 7. As required, each component may operate in either a "Remote Mode" or "Autonomous Mode".

As shown in the block diagram schematic embodiment of FIG. 8, the Cargo Fire Detection Control Unit (CFDCU) interfaces with all cargo fire detection and suppression apparatus on an aircraft, including the fire detectors and IR imagers of each compartment, the Cockpit Video Display, and the CIDS. It will be shown later in connection with the embodiment of FIG. 9 that the CFDCU also interfaces with the fire suppression gas generator canisters, and a Cockpit Fire Suppression Switch Panel. Accordingly, the CFDCU provides all system logic and test/fault isolation capabilities. It processes the fire detector and IR Imager signals input thereto to determine a fire condition and provides fire indication to the cockpit based on embedded logic. Test functions provide an indication of the operational status of each individual fire detector and IR imager to the cockpit and aircraft maintenance systems.

More specifically, the CFDCU incorporates two identical channels that are physically and electrically isolated from each other. In the present embodiment, each channel A and B is powered by separate power supplies. Each channel contains the necessary circuitry for processing Alarm and Fault signals from each fire detector and IR imager of the storage compartments of the aircraft. Partitioning is such that all fire detectors and IR imagers in both loops A and B of the system interface to both channels via dual CAN busses to achieve the dual loop functionality and full redundancy for optimum dispatch reliability. The CFDCU acts as the bus controller for the two CAN busses that interface with the fire detectors and IR imagers. Upon determining a fire indication in the same zone of a compartment by both loops A and B, the CFDCU sends signals to the CIDS over the data buses, for eventual transmission to the cockpit that a fire condition is detected. The CFDCU may also control the video selector switch to send an IR video image of the affected cargo compartment to the cockpit video display to allow the compartment to be viewed by the flight crew.

Figure 9:
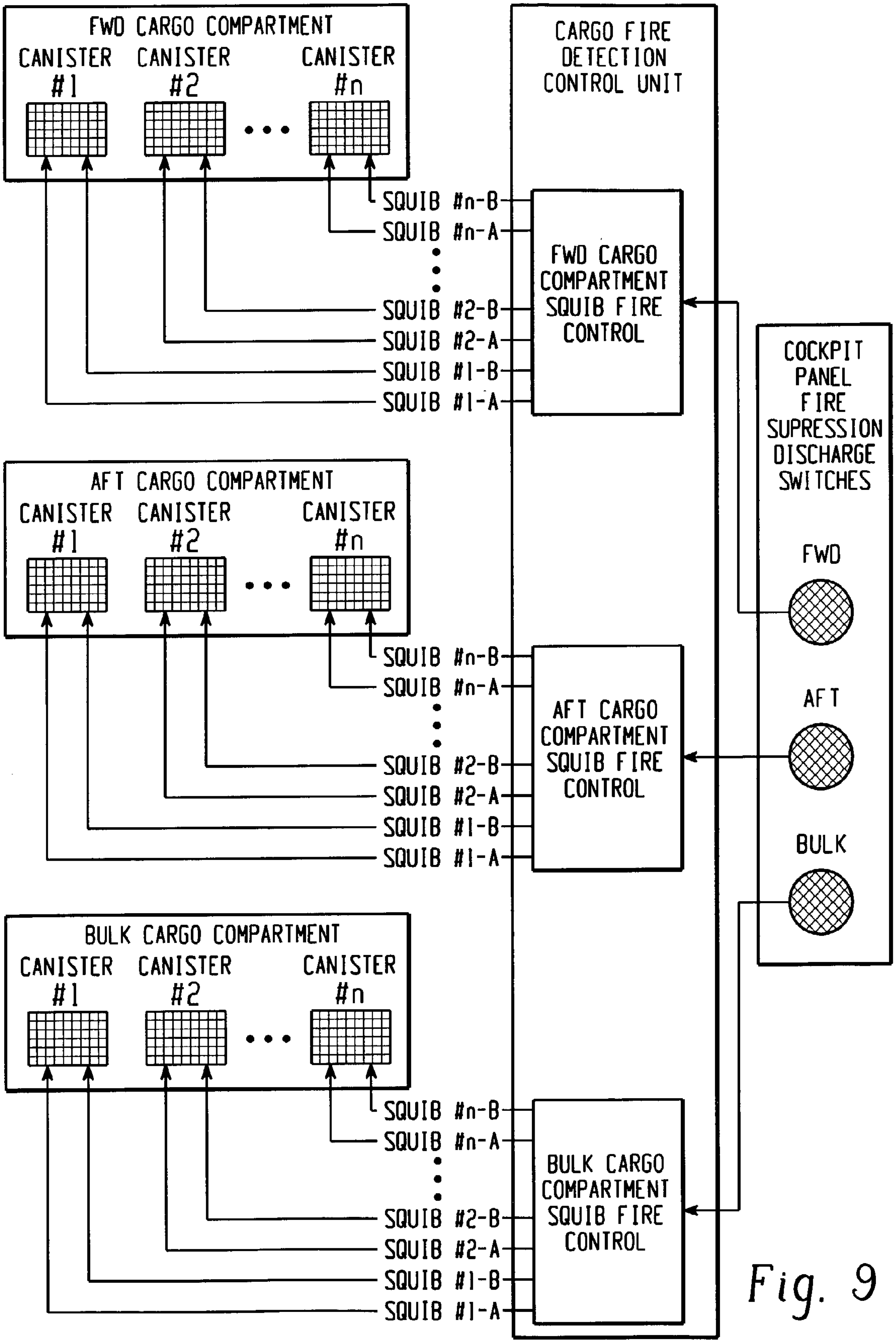
FIG. 9 is a block diagram schematic of an exemplary fire suppression system suitable for use in the application of an aircraft.

A block diagram schematic of an exemplary overall fire suppression system suitable for use in the present embodiment is shown in FIG. 9. As shown in FIG. 9, Squib fire controllers in the CFDCU also monitor and control the operation of the fire suppression canisters, #1, #2, . . . #n in the various compartments of the aircraft through use of squib activation signals Squib #1-A, Squib #1-B, . . . , Squib #n-A and Squib #n-B, respectively. Upon receipt of a discrete input from a fire suppression discharge switch on the Cockpit Fire Suppression Switch Panel, the respective squib fire controller fires the squibs in the suppressant canisters, as required. Verification that the squibs have fired is sent to the cockpit via the CIDS as shown in FIG. 8. The CFDCU may include BITE capabilities to improve field maintainability. These capabilities may include the performance of a complete checkout of the operation of CFDCU to insure that it detects failures to a minimum confidence level of on the order of 95%, for example.

More specifically. the CFDCU may perform three types of BITE: power-up, continuous, and initiated. Power-up BITE will be performed once at power-up and will typically consist of the following tests: memory test, watchdog circuit verification, microcontroller operation test, fire detector operation, IR imager operation, fire suppressant canister operation, and CAN bus interface verification, for example. Continuous BITE may be performed on a continuous basis and will typically consist of the following tests: watchdog and power supply voltage monitor, and input signal range reasonableness. Initiated BITE may be performed when directed by a discrete TEST Detector input or by a bus command and will typically perform the same tests as Power-up BITE.

The exemplary gas generators 22, 24 of the present embodiment will now be described in greater detail in connection with the break away assembly illustration of FIG. 11. The assembly is small enough to mount in unusable spaces in the storage compartment, e.g. cargo hold of an aircraft, and provides an ignition source for the propellant and a structure for dispensing hot aerosol while protecting the adjoining mounting structure of the aircraft, for example, from the hot aerosol. A modular assembly of the gas generator supports and protects the fire suppressant propellant during shipping, handling and use by a tubular housing 180. The modular design also allows the assembly to be used on various sized and shaped compartment or cargo holds by choosing the number of assemblies for each size. This assembly may be mountable within the space between the ceiling of the cargo hold and the floor of the cabin compartment as described in connection with the embodiment of FIG. 1. In the assembly, the propellant is supported by sheet metal baffles that force the hot aerosol to flow through the assembly allowing them to cool before being directed into the cargo hold through several exhaust ports 25. These ports 25 are closed with a plastic that hermetically seals the dispenser which provides the dual purpose of protecting the propellant from the environment as well as the environment from the propellant. An integral igniter is included in the assembly, which meets a 1-watt, 1-amp no-fire requirement.

Figure 11:
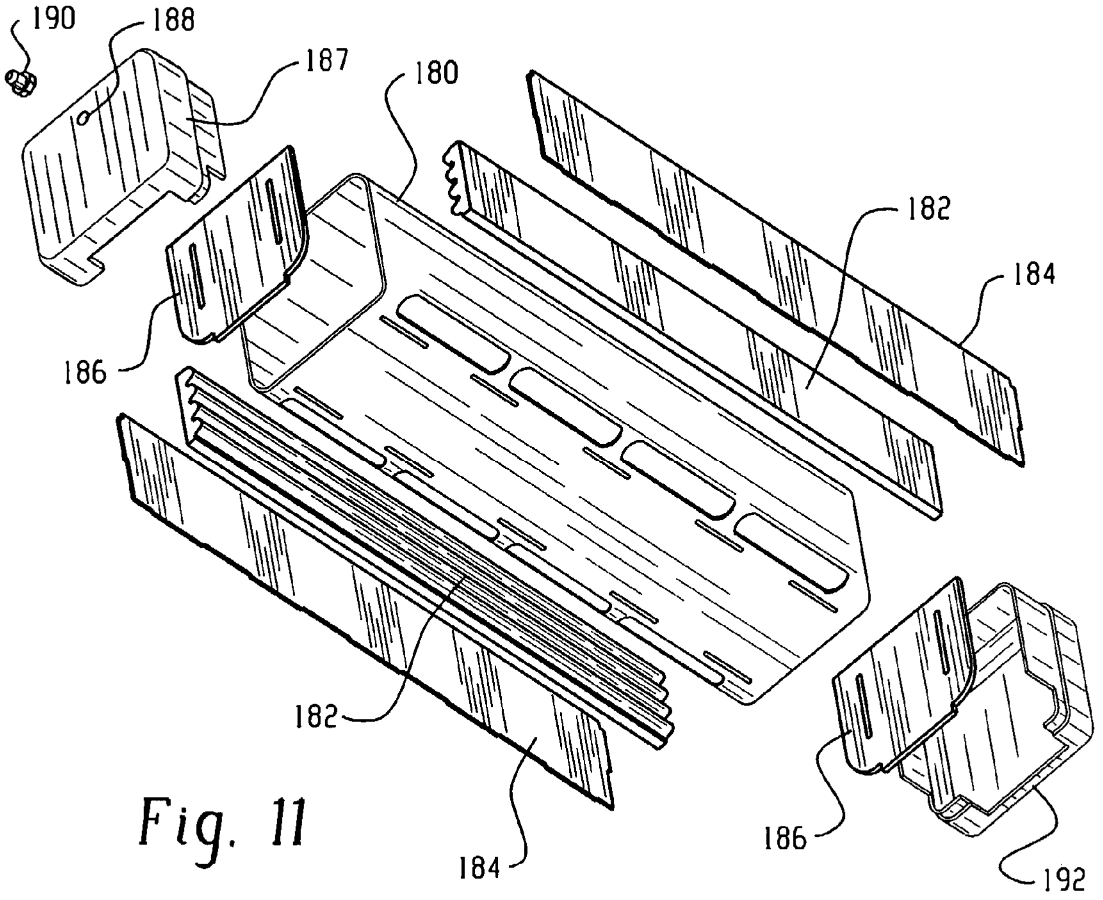
FIG. 11 is a break away assembly illustration of the gas generator of FIG. 10.

Referring to FIG. 11, more specifically, the assembly comprises a substantially square tube or housing 180 which may have dimensions of approximately 19" in length and 4" by 4" square, for example. The tube 180 supports the rest of the assembly. Several holes are stamped in one wall of the tube or housing 180 to provide mounting for mating parts and ports 25 that are used to direct the fire suppressant aerosol into the cargo hold. Two extruded propellants 182 which may be approximately 3⅓ pounds, for example, are mounted flat to surfaces of two sheet metal baffles 184, respectively. The baffles 184 are in turn mounted vertically within the square gas generator such that a gap between the top of the baffles 184 and the inside of the tube 180 exists to allow the hot aerosol to flow over the baffles 184 and out the ports 25 in the tube. Two additional baffles 186 cover the ends of the tubular housing 180. One end of the assembly is closed with a snap-on cap 187 which has a port 188 to secure a through bulkhead electrical connector 190. The other end of the assembly is also closed with another snap-on end cap 192. Inside the assembly attached to a face of each of the propellants 182 is a strip of ignition material that is ignited by an electric match. The electrical leads of the electric matches are connected to the through bulkhead electrical connector in order to provide the ignition current to the electric matches.

While the present invention has been described herein above in connection with a storage compartment of an aircraft, there is no intended limitation thereof to such an application. In fact, the present invention and all aspects thereof could be used in many different applications, storage areas and compartments without deviating from the broad principles thereof. Accordingly, the present invention should not be limited in any way, shape or form to any specific embodiment or application, but rather construed in breadth and broad scope in accordance with the recitation of the claims appended hereto.

What is claimed is:

1. A fire detection system for an enclosed area, said system comprising a plurality of infrared (IR) imagers oriented to view corresponding portions of the enclosed area, each IR imager of said plurality comprising:

an area array of IR radiation detectors for generating electrical signals of corresponding arrays of IR radiation measurements which are representative of infrared images of its corresponding portion of the enclosed area; and an image processor for processing said electrical signals of said infrared images to determine if a fire is perceived present in said portion of the enclosed area, and for generating a first signal indicative of said perceived presence of fire;

at least one fire detector for monitoring at least a portion of the enclosed area, said fire detector comprising at least one fire byproduct chemical sensor for generating at least one second signal representative of the presence of at least one fire byproduct chemical in the enclosed area; and a controller governed by said first signals generated by the plurality of IR imagers and said at least one second signal to confirm that a fire is present in the enclosed area.

2. The fire detection system of claim 1 wherein:

the enclosed area includes a plurality of detection zones; and including at least one fire detector for each detection zone.

3. The fire detection system of claim 2 wherein the controller comprises:

a first controller for each fire detector, said first controller governed by the second signals of the sensors of the corresponding fire detector to generate a third signal indicative of the presence of fire in corresponding detection zone; and a second controller coupled to the first controllers of the fire detectors and the plurality of IR imagers and governed by the first and third signals generated thereby to confirm that a fire is present in the enclosed area.

4. The fire detection system of claim 3 wherein the first and second controllers are operative independently of one another to confirm the presence of fire in the enclosed area.

5. The fire detection system of claim 3 including:

dual fire detectors for each detection zone;

wherein the fire detectors are coupled to the second controller over a dual loop bus.

6. The fire detection system of claim 1 wherein the first signals of the plurality of IR imagers are coupled to the controller over a dual loop bus.

7. The fire detection system of claim 1 wherein the sensors of the fire detector are disposed within a detection chamber.

8. The fire detection system of claim 1 wherein the at least one fire byproduct chemical sensor comprises a carbon monoxide sensor.

9. The fire detection system of claim 8 wherein the carbon monoxide sensor comprises a multi-layer micro-electromechanical system (MEMS) semiconductor structure.

10. The fire detection system of claim 9 wherein the MEMS carbon monoxide sensor comprises a tin oxide gas sensing layer.

11. The fire detection system of claim 10 wherein the MEMS carbon monoxide sensor comprises:

an aluminum substrate;

a ruthenium oxide heater layer; and a glass layer disposed between the substrate layer and heater layer for thermal isolation;

wherein the tin oxide layer being disposed over the heater layer with an insulating layer disposed therebetween.

12. The fire detection system of claim 8 wherein the carbon monoxide sensor includes a built in test portion.

13. The fire detection system of claim 1 wherein the at least one fire byproduct chemical sensor comprises a hydrogen sensor.

14. The fire detection system of claim 13 wherein the hydrogen sensor comprises a multi-layer micro-electromechanical system (MEMS) semiconductor structure.

15. The fire detection system of claim 14 wherein the MEMS hydrogen sensor comprises a tin oxide gas sensing layer.

16. The fire detection system of claim 13 wherein the hydrogen sensor includes a built in test portion.

17. The fire detection system of claim 1 wherein the at least one fire byproduct chemical sensor includes both a carbon monoxide sensor and a hydrogen sensor.

18. The fire detection system of claim 1:

wherein the fire detector includes a smoke sensor for generating a fourth signal indicative of the presence of smoke in the enclosed area; and wherein the controller is governed by the first, second and fourth signals to confirm that a fire is present in the enclosed area.

19. The fire detection system of claim 18 wherein the controller comprises:

a first controller for each fire detector, the first controller of the fire detector including the smoke sensor is governed by the second and fourth signals of the sensors of the corresponding fire detector to generate a third signal indicative of the presence of fire in the enclosed area; and a second controller coupled to the first controllers of the fire detectors and the plurality of IR imagers and governed by the first and third signals generated thereby to confirm that a fire is present in the enclosed area.

20. The fire detection system of claim 18 wherein the smoke sensor includes a built in test portion.

21. The fire detection system of claim 1 wherein each IR imager includes a built in test portion.

22. The fire detection system of claim 1 wherein each fire detector includes a built in test portion.

23. A fire detection system for an enclosed area having a plurality of detection zones, said system comprising:

a plurality of infrared (IR) imagers, each IR imager comprising:

an area array of IR radiation detectors for generating electrical signals of corresponding arrays of IR radiation measurements which are representative of infrared images of a corresponding portion of the enclosed area; and an image processor for processing said electrical signals of said infrared images to determine if a fire is perceived present in the corresponding portion, and for generating a first signal indicative of said perceived presence of fire;

at least one fire detector disposed at each detection zone, each fire detector for monitoring the corresponding detection zone of the enclosed area, each fire detector comprising at least one fire byproduct chemical sensor for generating at least one second signal representative of the presence of at least one fire byproduct chemical in the corresponding detection zone, and a first controller governed by the second signals for generating a third signal indicative of the presence of fire in the corresponding detection zone; and a second controller governed by said first signals generated by the plurality of IR imagers and said third signals corresponding to the plurality of detection zones to confirm that a fire is present in at least one detection zone of the enclosed area.

24. The fire detection system of claim 23 wherein the first and second controllers are operative independently of each other to confirm the presence of fire in the enclosed area.

25. The fire detection system of claim 23 including dual fire detectors for each detection zone; and wherein the fire detectors are coupled to the second controller over a dual loop bus.

26. The fire detection system of claim 25 including:

two IR imagers for the enclosed area;

wherein the IR imagers are coupled to the second controller over the dual loop bus.

27. The fire detection system of claim 26:

wherein the second controller includes third and fourth controllers;

wherein the dual loop bus is coupled to both the third and fourth controllers; and wherein each of the third and fourth controllers is operative independent of the other to confirm that a fire is present in at least one detection zone of the enclosed area based on the signals of the dual loop bus coupled thereto.

28. The fire detection system of claim 23 wherein each IR imager includes means for producing a video signal representing the infrared images generated thereby; and including a video display; and a video selection switch coupled to the video signals and the video display and governed by the second controller to select a video signal for display on the video display.

29. The fire detection system of claim 28 wherein the second controller includes means for selecting a video signal for display on the video display based on the confirmation of fire in one of the portions of the enclosed area.

30. The fire detection system of claim 23 wherein the enclosed area comprises a cargo hold of an aircraft.

31. The fire detection system of claim 23:

wherein at least one fire detector includes a smoke sensor for generating a fourth signal indicative of the presence of smoke in the corresponding detection zone; and wherein the first controller of each fire detector that includes the smoke sensor is governed by the second and fourth signals of the sensors of the corresponding fire detector to generate the third signal indicative of the presence of fire in the corresponding detection zone.

32. A fire detection system for a plurality of enclosed areas, each having a plurality of detection zones, said system comprising:

a plurality of infrared (IR) imagers for each enclosed area, each IR imager comprising:

an area array of IR radiation detectors for generating electrical signals of corresponding arrays of IR radiation measurements which are representative of infrared images of a corresponding portion of the corresponding enclosed area; and an image processor for processing said electrical signals of said infrared images to determine if a fire is perceived present in the corresponding portion, and for generating a first signal indicative of said perceived presence of fire;

at least one fire detector disposed at each detection zone of each enclosed area, each fire detector for monitoring the corresponding detection zone of the corresponding enclosed area, each fire detector comprising at least one fire byproduct chemical sensor for generating at least one second signal representative of the presence of at least one fire byproduct chemical in the corresponding detection zone, and a first controller governed by the second signals for generating a third signal indicative of the presence of fire in the corresponding detection zone; and a second controller governed by said first signals generated by the plurality of IR imagers of each enclosed area and said third signals corresponding to the plurality of detection zones of each enclosed area to confirm that a fire is present in at least one detection zone of at least one of the enclosed areas.

33. The fire detection system of claim 32 wherein the first and second controllers are operative independently of each other to confirm the presence of fire in at least one of the enclosed areas.

34. The fire detection system of claim 32 including:

dual fire detectors for each detection zone of each enclosed area;

wherein the fire detectors are coupled to the second controller over a dual loop bus.

35. The fire detection system of claim 34 including:

two IR imagers for each of the enclosed areas;

wherein the IR imagers are coupled to the second controller over the dual loop bus.

36. The fire detection system of claim 35:

wherein the second controller includes third and fourth controllers;

wherein the dual loop bus is coupled to both the third and fourth controllers; and wherein each of the third and fourth controllers is operative independent of the other to confirm that a fire is present in at least one detection zone of at least one enclosed area based on the signals of the dual loop bus coupled thereto.

37. The fire detection system of claim 32 wherein each IR imager includes means for producing a video signal representing the infrared images generated thereby; and including a video display; and a video selection switch coupled to the video signals and the video display and governed by the second controller to select a video signal for display on the video display.

38. The fire detection system of claim 37 wherein the second controller includes means for selecting a video signal for display on the video display based on the confirmation of fire in one of the portions of the enclosed areas.

39. The fire detection system of claim 32 wherein the enclosed areas comprise cargo holds of an aircraft.

40. The fire detection system of claim 32:

wherein at least one fire detector includes a smoke sensor for generating a fourth signal indicative of the presence of smoke in the corresponding detection zone; and wherein the first controller of each fire detector that includes the smoke sensor is governed by the second and fourth signals of the sensors of the corresponding fire detector to generate the third signal indicative of the presence of fire in the corresponding detection zone.

41. A fire detection system for an enclosed area, said system comprising:

a plurality of infrared (IR) imagers oriented to view corresponding portions of the enclosed area, each IR imager of said plurality comprising:

an area array of IR radiation detectors for generating electrical signals of corresponding arrays of IR radiation measurements which are representative of infrared images of its corresponding portion of the enclosed area; and an image processor for processing said electrical signals of said infrared images to determine if a fire is perceived present in said portion of the enclosed area, and for generating a first signal indicative of said perceived presence of fire;

at least one fire detector for monitoring at least a portion of the enclosed area, said fire detector comprising a smoke sensor for generating a second signal indicative of the presence of smoke in the enclosed area, and at least one fire byproduct chemical sensor for generating at least one third signal representative of the presence of at least one fire byproduct chemical in the enclosed area; and a controller governed by said first signals generated by the plurality of IR imagers, second signal, and at least one third signal to confirm that a fire is present in the enclosed area.

42. A fire detection system for an enclosed area having a plurality of detection zones, said system comprising:

a plurality of infrared (IR) imagers, each IR imager comprising:

an area array of IR radiation detectors for generating electrical signals of corresponding arrays of IR radiation measurements which are representative of infrared images of a corresponding portion of the enclosed area; and an image processor for processing said electrical signals of said infrared images to determine if a fire is perceived present in the corresponding portion, and for generating a first signal indicative of said perceived presence of fire;

at least one fire detector disposed at each detection zone, each fire detector for monitoring the corresponding detection zone of the enclosed area, each fire detector comprising a smoke sensor for generating a second signal indicative of the presence of smoke in the corresponding detection zone, at least one fire byproduct chemical sensor for generating at least one third signal representative of the presence of at least one fire byproduct chemical in the corresponding detection zone, and a first controller governed by the second and third signals for generating a fourth signal indicative of the presence of fire in the corresponding detection zone; and a second controller governed by said first signals generated by the plurality of IR imagers and said fourth signals corresponding to the plurality of detection zones to confirm that a fire is present in at least one detection zone of the enclosed area.

43. A fire detection system for a plurality of enclosed areas, each having a plurality of detection zones, said system comprising:

a plurality of infrared (IR) imagers for each enclosed area, each IR imager comprising:

an area array of IR radiation detectors for generating electrical signals of corresponding arrays of IR radiation measurements which are representative of infrared images of a corresponding portion of the corresponding enclosed area; and an image processor for processing said electrical signals of said infrared images to determine if a fire is perceived present in the corresponding portion, and for generating a first signal indicative of said perceived presence of fire;

at least one fire detector disposed at each detection zone of each enclosed area, each fire detector for monitoring the corresponding detection zone of the corresponding enclosed area, each fire detector comprising a smoke sensor for generating a second signal indicative of the presence of smoke in the corresponding detection zone, at least one fire byproduct chemical sensor for generating at least one third signal representative of the presence of at least one fire byproduct chemical in the corresponding detection zone, and a first controller governed by the second and third signals for generating a fourth signal indicative of the presence of fire in the corresponding detection zone; and a second controller governed by said first signals generated by the plurality of IR imagers of each enclosed area and said fourth signals corresponding to the plurality of detection zones of each enclosed area to confirm that a fire is present in at least one detection zone of at least one of the enclosed areas.

* * * * *